United States Patent
Kida

(10) Patent No.: US 10,847,121 B2
(45) Date of Patent: Nov. 24, 2020

(54) DISPLAY APPARATUS AND METHOD FOR CONTROLLING DISPLAY APPARATUS DISPLAYING IMAGE WITH SUPERIMPOSED MASK

(71) Applicant: SEIKO EPSON CORPORATION, Tokyo (JP)

(72) Inventor: Kensuke Kida, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 102 days.

(21) Appl. No.: 16/023,342

(22) Filed: Jun. 29, 2018

(65) Prior Publication Data
US 2019/0012986 A1  Jan. 10, 2019

(30) Foreign Application Priority Data
Jul. 7, 2017 (JP) .................. 2017-133413

(51) Int. Cl.
*G09G 5/34* (2006.01)
*G09G 5/377* (2006.01)
(Continued)

(52) U.S. Cl.
CPC ............ *G09G 5/34* (2013.01); *G09G 5/373* (2013.01); *G09G 5/377* (2013.01); *H04N 9/31* (2013.01); *H04N 9/3179* (2013.01); *G09G 2340/045* (2013.01); *G09G 2340/0464* (2013.01); *G09G 2340/12* (2013.01); *G09G 2354/00* (2013.01)

(58) Field of Classification Search
CPC .................. G09G 5/377; G09G 5/34
See application file for complete search history.

(56) References Cited

U.S. PATENT DOCUMENTS 5,752,239 A * 5/1998 Coutts ..................... A63F 13/00
                                                        705/27.2
2017/0053325 A1* 2/2017 VanDuyn ............... G06F 3/0485

FOREIGN PATENT DOCUMENTS

JP    H5-313646 A    11/1993
JP    H06-98276 A    4/1994
(Continued)

OTHER PUBLICATIONS

Kost, "Creating Masks to Move Over Time in Photoshop", Mar. 16, 2015, 'https://www.youtube.com/watch?v=ngs5uo7VAy0&t=2s' (Year: 2015).*

(Continued)

*Primary Examiner* — Mark K Zimmerman
*Assistant Examiner* — Jonathan M Cofino
(74) *Attorney, Agent, or Firm* — Oliff PLC

(57) ABSTRACT

A projector includes a display controller that scrolls image data within liquid crystal panels in accordance with operation accepted via an operation/display panel in a case where a display section displays the image data and scrolls the image data that forms combined image data within liquid crystal panels in accordance with operation accepted by the operation/display panel in a case where the display section displays the combined image data. A scroll range over which the image data that forms the combined image data is scrolled in the case where the display section displays the combined image data is wider than a scroll range over which the image data is scrolled in the case where the display section displays the image data.

12 Claims, 9 Drawing Sheets

(51) Int. Cl.
    *G09G 5/373*     (2006.01)
    *H04N 9/31*     (2006.01)

(56) References Cited

FOREIGN PATENT DOCUMENTS

| | | |
|---|---|---|
| JP | H06-225214 A | 8/1994 |
| JP | H09-34409 A | 2/1997 |
| JP | H09-160746 A | 6/1997 |
| JP | 2004-13514 A | 1/2004 |
| JP | 2007-265151 A | 10/2007 |
| JP | 2016-25418 A | 2/2016 |

OTHER PUBLICATIONS

TutorVidCom, "Photoshop Tutorial—How to Resize a Layer [60 Seconds]", Feb. 16, 2011, 'https://www.youtube.com/watch?v=X8J3jSRWylY' (Year: 2011).*

* cited by examiner

DISPLAY APPARATUS AND METHOD FOR CONTROLLING DISPLAY APPARATUS DISPLAYING IMAGE WITH SUPERIMPOSED MASK

CROSS-REFERENCE

The entire disclosure of Japanese Patent Application No. 2017-133413, filed Jul. 7, 2017 is expressly incorporated by reference herein.

BACKGROUND

1. Technical Field

The present invention relates to a display apparatus and a method for controlling the display apparatus.

2. Related Art

There is a known display apparatus capable of scrolling a displayed image in accordance with a user's operation (see JP-A-2007-265151, for example).

In the display apparatus described in JP-A-2007-265151, when any of the up, down, right, and left keys is operated in the scroll mode, the controller controls the display section to scroll the image in the direction corresponding to the operated key.

As the image is scrolled in accordance with the scroll operation, the proportion of a displayed blank area that is an area outside the image increases. Since the blank area is not an area that is desired to be displayed in the first place, it is conceivable to limit the range over which the image is scrollable to a fixed range so that the ratio of the blank area to the overall display area is not excessively large.

On the other hand, depending on the image display state, it is preferable in some cases that the image is allowed to be scrolled over a range wider than the fixed range, and always limiting the scrollable range in the same manner undesirably lowers usability of the display apparatus in some cases.

SUMMARY

An advantage of some aspects of the invention is to increase the operability of a display apparatus.

An aspect of the invention is directed to a display apparatus including a display section that displays an image in a display area, an operation section that accepts operation, a superimposing section that produces a superimposed image that is an input image on which a mask image is superimposed, and a display controller that causes the display section to display one of the input image and the superimposed image in accordance with operation accepted by the operation section. The display controller scrolls the input image within the display area in accordance with operation accepted by operation section in a case where the display section displays the input image, and the display controller scrolls the input image that forms the superimposed image within the display area in accordance with operation accepted by the operation section in a case where the display section displays the superimposed image. A scroll range over which the input image that forms the superimposed image is scrolled in the case where the display section displays the superimposed image is wider than a scroll range over which the input image is scrolled in the case where the display section displays the input image.

According to the aspect of the invention, the scroll range over which the input image that forms the superimposed image is scrolled in the case where the display section displays the superimposed image is wider than the scroll range over which the input image is scrolled in the case where the display section displays the input image. The scroll range over which the input image is scrolled can therefore be changed in accordance with the image display state, whereby the operability of the display apparatus can be increased.

In the aspect of the invention, in the case where the display section displays the superimposed image, the display controller may scroll the input image within the display area in such a way that a blank area outside the input image falls within the display area, and in the case where the display section displays the input image, the display controller may scroll the input image within the display area in such a way that the blank area outside the input image does not fall within the display area.

According to the aspect of the invention with this configuration, in the case where the display section displays the superimposed image, the input image is so scrolled that the blank area outside the input image falls within the display area, and in the case where the display section displays the input image, the input image is so scrolled within the display area that the blank area outside the input image does not fall within the display area. The scroll range over which the input image is scrolled can therefore be changed in accordance with the image display state, whereby the operability of the display apparatus can be increased.

In the aspect of the invention, the mask image may have a mask area that masks the input image in the superimposed image and a non-mask area that does not mask the input image in the superimposed image, and in a case where the non-mask area is superimposed on a range containing a blank area outside the input image, the display controller may determine that operation accepted by the operation section is invalid.

According to the aspect of the invention with this configuration, in the case where the non-mask area is superimposed on a range containing an area outside the input image, accepted operation is determined to be invalid. A situation in which the blank area outside the input image is not masked but is displayed can therefore be avoided.

In the aspect of the invention, the display controller may change a position of the input image on which the mask image is superimposed in accordance with operation accepted by the operation section to change a range of the input image displayed as part of the superimposed image.

According to the aspect of the invention with this configuration, the range of the input image that is not masked by the mask image but is displayed can be changed in the superimposed image.

In the aspect of the invention, in a state in which the display section displays the superimposed image, and in a case where the display controller causes a range containing an area outside the superimposed image to be displayed in the display area in accordance with operation accepted by the operation section, the display controller may cause the mask image to be displayed in an area of the display area that corresponds to the area outside the superimposed image.

According to the aspect of the invention with this configuration, in the case where a range containing an area outside the superimposed image is displayed, the mask image can be displayed.

In the aspect of the invention, the mask image may be an image in which a predetermined range of the mask image is the non-mask area and a range excluding the predetermined range is the mask area.

According to the aspect of the invention with this configuration, in image data on which the mask image is superimposed, the predetermined range can be displayed, and the range excluding the predetermined range can be masked.

In the aspect of the invention, the display controller may enlarge the input image that forms the superimposed image in accordance with operation accepted by the operation section.

According to the aspect of the invention with this configuration, the input image that forms the superimposed image can be enlarged.

Another aspect of the invention is directed to a method for controlling a display apparatus including a display section that displays an image in a display area, an operation section that accepts operation, and a superimposing section that produces a superimposed image that is an input image on which a mask image is superimposed, the method including causing the display section to display one of the input image and the superimposed image in accordance with the operation accepted by operation section, scrolling the input image within the display area in accordance with operation accepted by the operation section in a case where the display section displays the input image, and scrolling the input image that forms the superimposed image within the display area in accordance with operation accepted by the operation section in a case where the display section displays the superimposed image, and a scroll range over which the input image that forms the superimposed image is scrolled in the case where the display section displays the superimposed image is wider than a scroll range over which the input image is scrolled in the case where the display section displays the input image.

According to the aspect of the invention, the scroll range over which the input image that forms the superimposed image is scrolled in the case where the display section displays the superimposed image is wider than the scroll range over which the input image is scrolled in the case where the display section displays the input image. The scroll range over which the input image is scrolled can therefore be changed in accordance with the image display state, whereby the operability of the display apparatus can be increased.

In the aspect of the invention, in the case where the display section displays the superimposed image, the input image may be so scrolled within the display area that a blank area outside the input image falls within the display area, and in the case where the display section displays the input image, the input image may be so scrolled within the display area that the blank area outside the input image does not fall within the display area.

According to the aspect of the invention with this configuration, in the case where the display section displays the superimposed image, the input image is so scrolled that the blank area outside the input image falls within the display area, and in the case where the display section displays the input image, the input image is so scrolled within the display area that the blank area outside the input image does not fall within the display area. The scroll range over which the input image is scrolled can therefore be changed in accordance with the image display state, whereby the operability of the display apparatus can be increased.

In the aspect of the invention, the mask image may have a mask area that masks the input image in the superimposed image and a non-mask area that does not mask the input image in the superimposed image, and in a case where the non-mask area is superimposed on a range containing a blank area outside the input image, it may be determined that operation accepted by the operation section is invalid.

According to the aspect of the invention with this configuration, in the case where the non-mask area is superimposed on a range containing an area outside the input image, accepted operation is determined to be invalid. A situation in which the blank area outside the input image is not masked but is displayed can therefore be avoided.

In the aspect of the invention, a position of the input image on which the mask image is superimposed is so changed in accordance with operation accepted by the operation section that a range of the input image displayed as part of the superimposed image is changed.

According to the aspect of the invention with this configuration, the range of the input image that is not masked by the mask image but is displayed can be changed in the superimposed image.

In the aspect of the invention, in a state in which the display section displays the superimposed image, and in a case where a range containing an area outside the superimposed image is displayed in the display area in accordance with operation accepted by the operation section, the mask image may be displayed in an area of the display area that corresponds to the area outside the superimposed image.

According to the aspect of the invention with this configuration, in the case where a range containing an area outside the superimposed image is displayed, the mask image can be displayed.

In the aspect of the invention, the mask image may be an image in which a predetermined range of the mask image is the non-mask area and a range excluding the predetermined range is the mask area.

According to the aspect of the invention with this configuration, in image data on which the mask image is superimposed, the predetermined range can be displayed, and the range excluding the predetermined range can be masked.

In the aspect of the invention, the input image that forms the superimposed image may be enlarged in accordance with operation accepted by the operation section.

According to the aspect of the invention with this configuration, the input image that forms the superimposed image can be enlarged.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the accompanying drawings.

Figure 1:
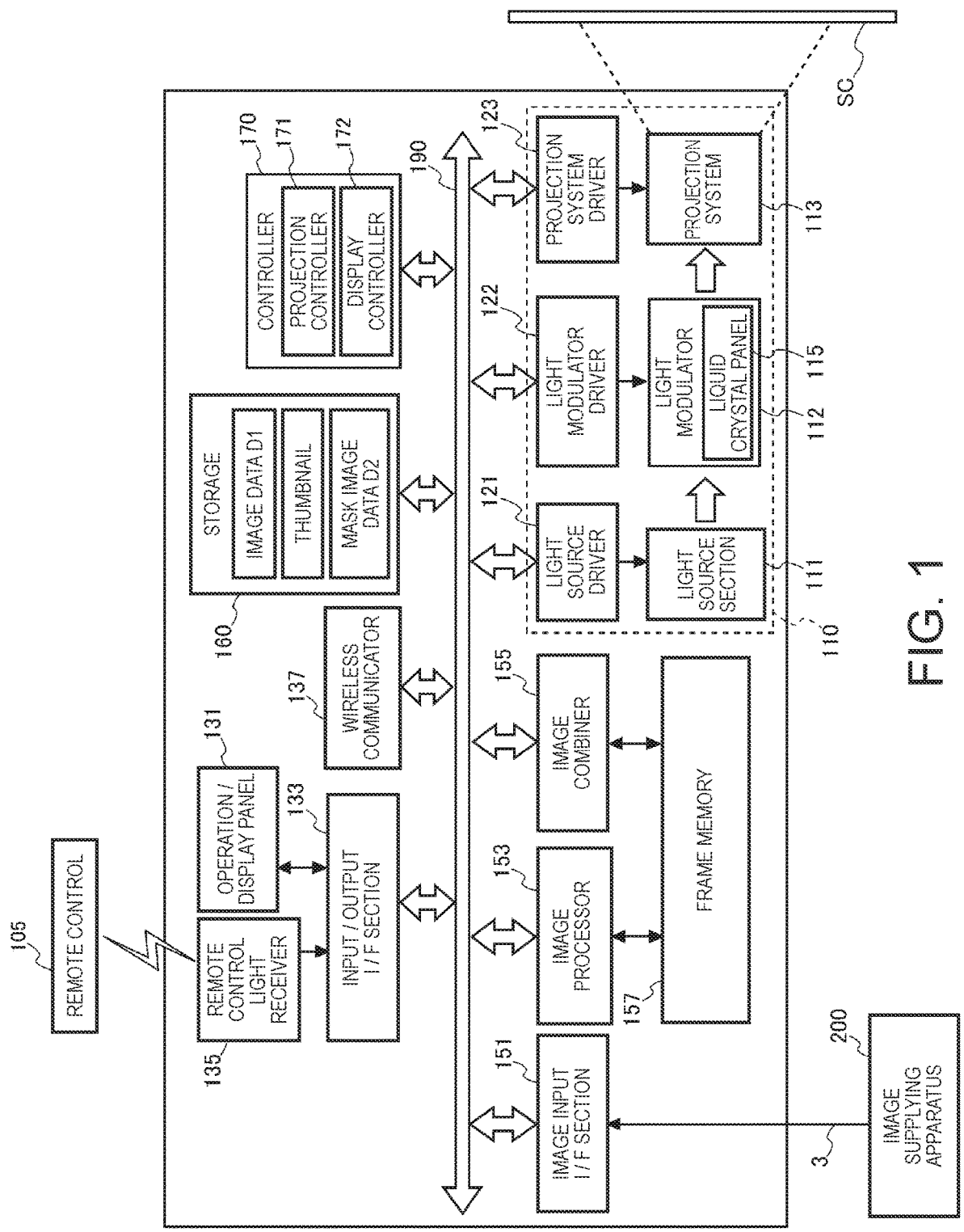
FIG. 1 is a configuration diagram showing the configuration of a projector.

FIG. 1 is a configuration diagram showing the configuration of a projector 100 as an embodiment to which the invention is applied. The projector 100 corresponds to the "display apparatus" according to an aspect of the invention.

The projector 100 is connected to an image supplying apparatus 200 and receives supply of image data from the image supplying apparatus 200. The connection between the projector 100 and the image supplying apparatus 200 may, for example, be wired or wireless connection. The image supplying apparatus 200 can, for example, be a video reproducing apparatus, a DVD (digital versatile disk) reproducing apparatus, a television tuner, a CATV (cable television) set top box, a video game console or any other video output apparatus, or a personal computer.

The projector 100 includes an image input interface section (hereinafter abbreviated to image input I/F section) 151. The image input I/F section 151 includes a connector for wired connection and an interface circuit that supports the connector (neither connector nor interface circuit is shown), and the image input I/F section 151 is connected to the image supplying apparatus 200 via a cable 3.

An interface that can be employed as the image input I/F section 151 can, for example, be a DVI interface, a USB interface, and a LAN interface, to which a digital video signal is inputted. The interface of the image input I/F section 151 may instead, for example, be an S video terminal, to which an NTSC, PAL, SECAM, or any other composite video signal is inputted, an RCA terminal, to which a composite video signal is inputted, or a D terminal, to which a component video signal is inputted. Still instead, the interface of the image input I/F section 151 can be a general-purpose interface, such as an HDMI connector compliant with the HDMI (registered trademark) standard. The image input I/F section 151 may include an A/D conversion circuit, which converts an analog video signal into digital image data, and may be connected to the image supplying apparatus 200 via a VGA terminal or any other analog video terminal. The image input I/F section 151 may transmit and receive an image signal over wired or wireless communication.

The image input I/F section 151, when it receives image data, outputs the received image data to an image processor 153 or a controller 170, which will be described later.

The projector 100 includes a display section 110, which forms and projects an optical image onto a screen SC. The display section 110 includes a light source section 111, a light modulator 112, a projection system 113, a light source driver 121, a light modulator driver 122, and a projection system driver 123.

The light source section 111 includes a light source formed, for example, of a xenon lamp, an ultrahigh-pressure mercury lamp, an LED (light emitting diode), or a laser light source. The light source section 111 may include a reflector and an auxiliary reflector that guide light emitted by the light source to the light modulator 112. The light source section 111 may further include a lens group for enhancing the optical characteristics of the projection light, a polarizer, a light adjusting element that is disposed in the path leading to the light modulator 112 and attenuates the amount of the light emitted by the light source, or any other component (none of the components described above is shown).

The light source driver 121 is connected to the light source section 111 and a bus 190 and controls operation of turning on and off the light source section 111 under the control of the controller 170, which is also connected to the bus 190.

The light modulator 112 includes three liquid crystal panels 115 corresponding to the three primary colors, R (red), G (green), and B (blue). The liquid crystal panels 115 correspond to the "display area" in an aspect of the invention.

The light outputted by the light source section 111 is separated by an optical system that is not shown into RGB three color light fluxes, which are incident on the corresponding liquid crystal panels 115. The three liquid crystal panels 115 are each a transmissive liquid crystal panel and modulate the color light fluxes passing therethrough to generate image light fluxes. The modulated image light fluxes having passed through the liquid crystal panels 115 are combined with one another by a light combining system, such as a cross dichroic prism, and the combined light is directed to the projection system 113.

The light modulator driver 122 is connected to the light modulator 112 and the bus 190 and draws an image in each of the liquid crystal panels 115 of the light modulator 112 under the control of the controller 170.

The light modulator driver 122 produces R, G, and B drive signals based on the image data inputted from the image processor 153, which will be described later. The light modulator driver 122 drives, based on the produced R, G, and B drive signals, the corresponding liquid crystal panels 115 of the light modulator 112 to draw images in the liquid crystal panels 115.

The projection system 113 includes a projection lens (not shown) that projects the modulated image light fluxes from the light modulator 112 toward the screen SC to form an image on the screen SC. The projection lens is a zoom lens having the function of adjusting the angle of view, that is, adjusting the size of an image to be projected (zoom adjustment). The projection lens further has the function of adjusting the focal position (focus adjustment).

The projection system driver 123 includes a motor that drives the projection system 113 and connected to the projection system 113 and the bus 190. The projection system driver 123 drives the motor under the control of the controller 170 to adjust the position of the projection lens and adjust the zooming and focusing.

The projector 100 includes an operation/display panel 131, an input/output I/F section 133, and a remote control light receiver 135. The input/output I/F section 133 is connected to the operation/display panel 131, the remote control light receiver 135, and the bus 190. The operation/display panel 131, which functions as a user interface, is provided with a variety of operation keys and a display panel using an LCD (liquid crystal display) or any other component. The input/output I/F section 133 causes the operation/display panel 131 to display a variety of screens based on a control signal inputted from the controller 170.

The operation/display panel 131 is provided with a power key for powering on and off the projector 100 and a variety of operation keys, such as a menu key for making a variety of settings. When any of the operation keys is operated, the input/output I/F section 133 outputs an operation signal corresponding to the operated key to the controller 170.

The remote control light receiver 135 receives an infrared signal transmitted from a remote control 105. The remote control 105, which is operated by a user, includes a variety of buttons and transmits an infrared signal in correspondence with operation performed on any of the buttons. The input/output I/F section 133 decodes the infrared signal received by the remote control light receiver 135 to produce an operation signal representing the content of the operation performed on the remote control 105 and outputs the operation signal to the controller 170.

The projector 100 includes a wireless communicator 137. The wireless communicator 137 is connected to the bus 190 and operates under the control of the controller 170.

The wireless communicator 137 includes an antenna, an RF (radio frequency) circuit, and other components that are not shown and wirelessly communicates with an external apparatus under the control of the controller 170. The wireless communication scheme employed by the wireless communicator 137 can, for example, be a short-range wireless communication scheme, such as a wireless LAN (local area network), Bluetooth (registered trademark), UWB (ultra-wide band), and infrared communication. The wireless communication scheme employed by the wireless communicator 137 may instead be a wireless communication scheme using a mobile phone line.

The projector 100 includes an image processing system. The image processing system is primarily formed of the controller 170, which oversees and controls the entire projector 100, and further includes an image processor 153, an image combiner 155, a frame memory 157, and a storage 160. The controller 170, the image processor 153, the image combiner 155, and the storage 160 are connected to the bus 190.

The storage 160 is an auxiliary storage device, for example, a hard disk drive. The storage 160 can be replaced with a DRAM (dynamic RAM) or a device that allows large-capacity information storage, such as a flash memory and an optical disk including a CD (compact disc), a DVD (digital versatile disc), and a BD (Blu-ray (registered trademark) disc). The storage 160 stores a control program executed by the controller 170 and a variety of pieces of data, such as parameters used in image processing performed by the image processor 153.

The storage 160 further stores image data D1 and mask image data D2.

The image data D1 may be data stored in advance in the storage 160 or data received from the image supplying apparatus 200 via the image input I/F section 151.

The controller 170, when it receives image data D1 via the image input I/F section 151, creates a thumbnail image of the received image data D1. The controller 170 causes the storage 160 to store the image data D1 and the thumbnail image thereof. An image represented by the image data D1 corresponds to the "input image" in an aspect of the invention.

Figure 2:
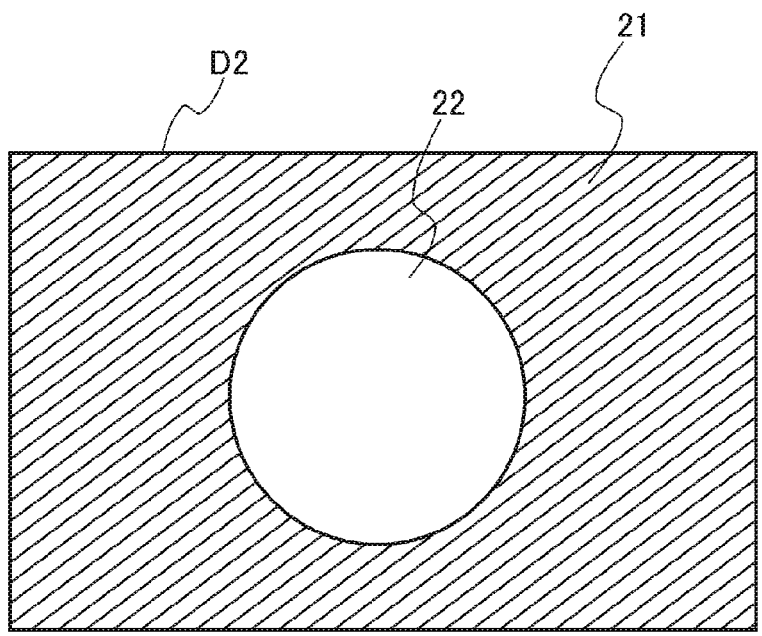
FIG. 2 shows an example of mask image data.

FIG. 2 shows an example of the mask image data D2. An image represented by the mask image data D2 corresponds to the "mask image" in an aspect of the invention.

The mask image data D2 is an image that is superimposed on the image data D1 to mask part of the image data D1. The present embodiment will be described with reference to a case where the mask image data D2 is data that masks part of the image data D1, and the mask image data D2 may instead, for example, be what is called vignette image data, which is decorative frame image data.

The mask image data D2 shown in FIG. 2 has a non-mask area 22, which is formed in a central area (predetermined range) of the mask image data D2, and a mask area 21, which masks the range other than the central area (predetermined range). The hatched area in FIG. 2 corresponds to the mask area 21. The mask area 21 is, for example, an area formed of black image data. The mask image data D2 shown in FIG. 2 has the circular non-mask area 22, but the non-mask area 22 does not necessarily have a circular shape and may instead, for example, have a triangular, quadrangular, or any other polygonal shape. The non-mask area 22 may be located at the center of the mask image data D2 or the periphery thereof. FIG. 2 shows one non-mask area 22, and the mask image data D2 may have a plurality of non-mask areas 22.

The frame memory 157 has a plurality of banks. The banks each have storage capacity that allows one frame of image data to be written. The frame memory 157 can be formed, for example, of an SDRAM (synchronous dynamic random access memory). An SDRAM is a DRAM that reads and writes data in synchronization with a clock.

The image processor 153 reads image data D1 from the storage 160 and develops the read image data D1 in the frame memory 157. The image processor 153 performs image processing on the image data D1 developed in the frame memory 157 under the control of the controller 170. The image processing performed by the image processor 153 includes, for example, resolution conversion, resizing, trapezoidal distortion correction or any other shape correction, digital zooming, color tone correction, luminance correction, and blurring. The image processing performed by the image processor 153 may be any one of the types of image processing described above, or a plurality of the types of processing may be combined with one another and carried out.

The image combiner 155 reads mask image data D2 from the storage 160 in accordance with an instruction from the controller 170 and develops the read mask image data D2 in the frame memory 157. In a case where the mask image data D2 is developed in the frame memory 157 where the image data D1 has been developed, combined image data D3, which is the image data D1 on which the mask image data D2 is superimposed, is produced. An image represented by the combined image data D3 corresponds to the "superimposed image" in an aspect of the invention.

The image combiner 155 reads the produced combined image data D3 from the frame memory 157 at a predetermined timing and outputs the read combined image data D3 to the light modulator driver 122. The image combiner 155 corresponds to the "superimposing section" in an aspect of the invention.

The image data developed in the frame memory 157 is read by the image combiner 155 and drawn in the liquid crystal panels 115 by the light modulator driver 122. The pixels of the frame memory 157 correspond to the pixels of each of the liquid crystal panels 115. When the image processor 153 or the image combiner 155 changes the position or range of image data developed in the frame memory 157, the position or range of the image data drawn in each of the liquid crystal panels 115 is also changed.

The controller 170 is formed of hardware in the form of a processor, such as a CPU (central processing unit), a ROM (read only memory), a RAM (random access memory), and other peripheral circuit (none of which is shown) and controls each portion of the projector 100.

The ROM is a nonvolatile memory and stores a control program, such as firmware, and computation data. The RAM is used as a work area that temporarily stores the firmware executed by the processor and the computation data used by the processor. The processor develops the control program, which is read from the ROM or the storage 160, in the RAM and executes the developed control program to control each portion of the projector 100.

The processor may further perform the functions of the light source driver 121, the light modulator driver 122, the projection system driver 123, the input/output I/F section 133, the image processor 153, and other components.

A single CPU (or semiconductor ship) may perform the functions of the controller 170 (or the functions of the light source driver 121, the light modulator driver 122, the projection system driver 123, the input/output I/F section 133, the image processor 153, the image combiner 155, and other components in addition to the functions of the controller 170). Instead, a plurality of CPUs (or semiconductor chips) may perform the functions of the controller 170 (or the functions of the light source driver 121, the light modulator driver 122, the projection system driver 123, the input/output I/F section 133, the image processor 153, the image combiner 155, and other components in addition to the functions of the controller 170).

The controller 170 includes a projection controller 171 and a display controller 172 as functional blocks. The functional blocks represent functions achieved when the processor carries out computation processes according to the control program for convenience in the form of blocks and do not each stand for a specific application or hardware.

The projection controller 171 controls each portion of the projector 100 to control projection of an image on the screen SC. For example, the projection controller 171 controls the light modulator driver 122 to cause it to draw images in the liquid crystal panels 115 of the light modulator 112. The projection controller 171 further controls the light source driver 121 to cause it to turn on the light source in the light source section 111 and adjust the luminance of the light emitted from the light source. The projection controller 171 further controls the projection system driver 123 to cause it to adjust the zooming and focusing performed by the projection lens. The light radiated from the light source section 111 is thus modulated, when it passes through the liquid crystal panels 115 of the light modulator 112, into image light, and the modulated image light is projected via the projection system 113 onto the screen SC.

The display controller 172 controls each portion of the projector 100 in accordance with operation accepted via the operation/display panel 131 or the remote control 105 to cause the projector 100 to display an image on the screen SC. For example, the display controller 172, when it accepts operation of selecting image data D1 to be displayed on the screen SC via the operation/display panel 131 or the remote control 105, controls the image processor 153 to cause it to develop the selected image data D1 in the frame memory 157. Similarly, the display controller 172, when it accepts operation of selecting mask image data D2 via the operation/display panel 131 or the remote control 105, controls the image combiner 155 to cause it to develop the selected mask image data D2 in the frame memory 157.

The display controller 172 further controls the image processor 153 to cause it to control the position where the image data D1 is developed in the frame memory 157. Similarly, the display controller 172 controls the image combiner 155 to cause it to control the position where the mask image data D2 is developed in the frame memory 157.

Figure 3:
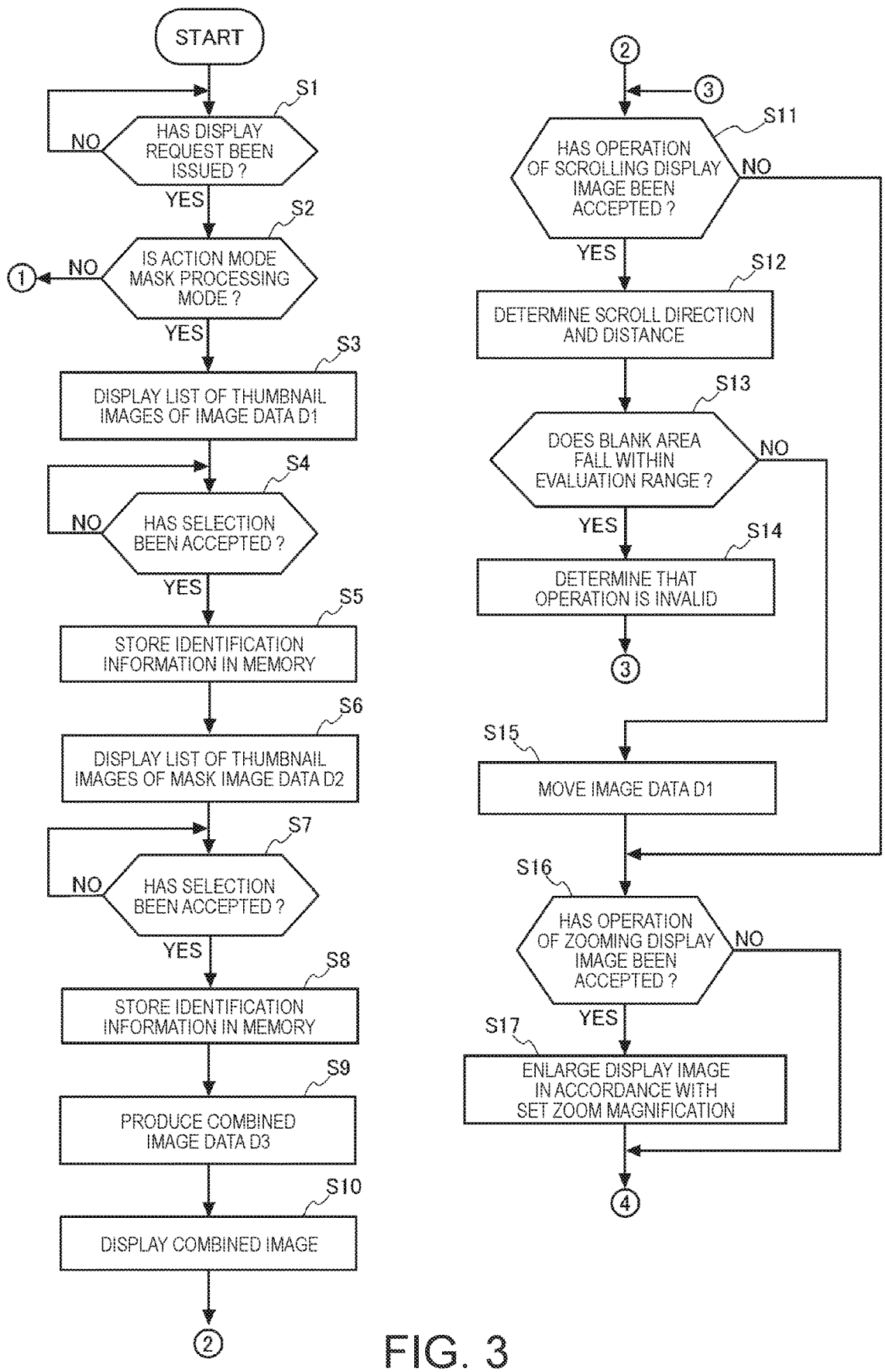
FIG. 3 is a flowchart showing actions of a display controller.
Figure 4:
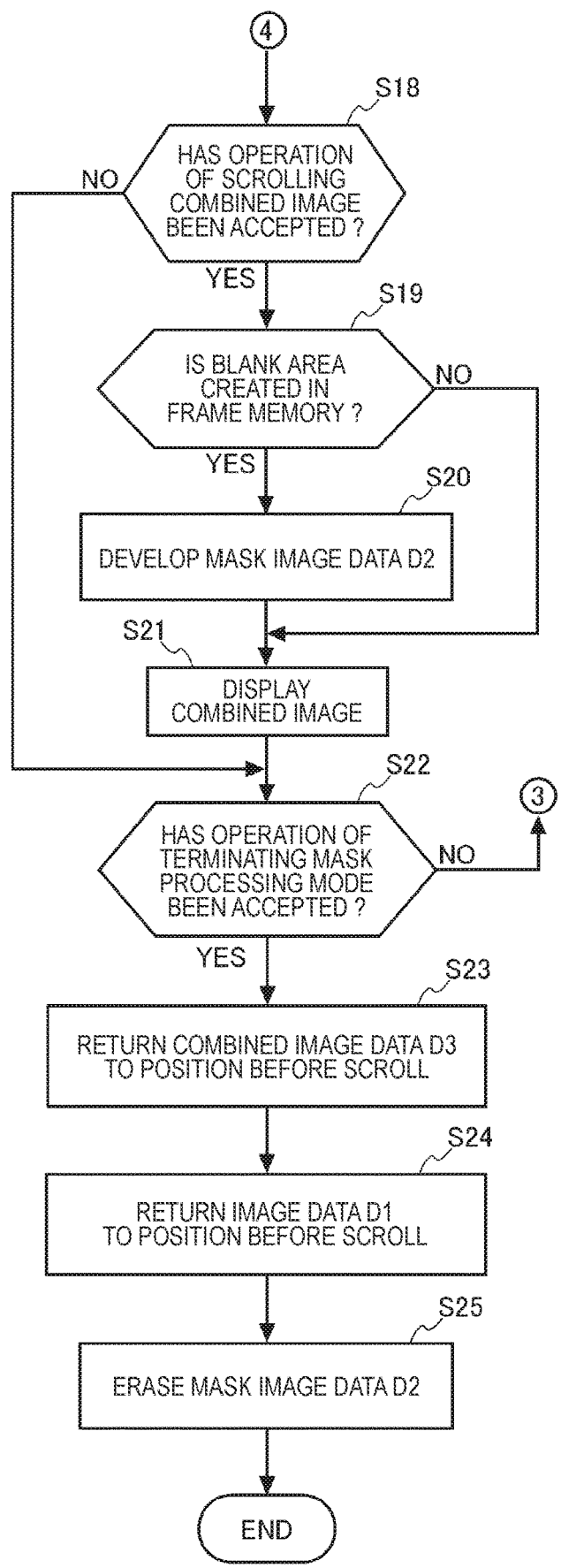
FIG. 4 is a flowchart showing actions of the display controller.

FIGS. 3 and 4 are flowcharts showing actions of the display controller 172.

The projector 100 has a normal mode and a mask processing mode as action modes. The normal mode is an action mode in which image data D1 supplied from the image supplying apparatus 200 or image data D1 stored in advance in the storage 160 is displayed on the screen SC. The mask processing mode is an action mode in which mask image data D2 is superimposed on image data D1 and the combined image data is displayed on the screen SC.

The display controller 172 evaluates whether or not an image display request has been accepted in response to operation performed on the operation/display panel 131 or the remote control 105 (step S1). In a case where no image display request has been accepted (NO in step S1), the display controller 172 waits until an image display request is accepted, or in a case where there is another executable process, the display controller 172 carries out the process.

In a case where an image display request has been accepted in response to operation performed on the operation/display panel 131 or the remote control 105 (YES in step S1), the display controller 172 evaluates whether or not the action mode of the projector 100 has been set at the mask processing mode (step S2). The action of the projector in a case where the action mode of the projector 100 has not been set at the mask processing mode, that is, in a case where the action mode is the normal mode will be described later with reference to the flowchart shown in FIG. 12.

In a case where the action mode of the projector 100 has been set at the mask processing mode (YES in step S2), the display controller 172 reads the thumbnail images of the image data D1 stored in the storage 160. The display controller 172 produces a display image list that lists the read thumbnail images and causes the operation/display panel 131 to display the list (step S3). The user operates the operation keys on the operation/display panel 131 to select one of thumbnail images in the display image list displayed on the operation/display panel 131.

Figure 5:
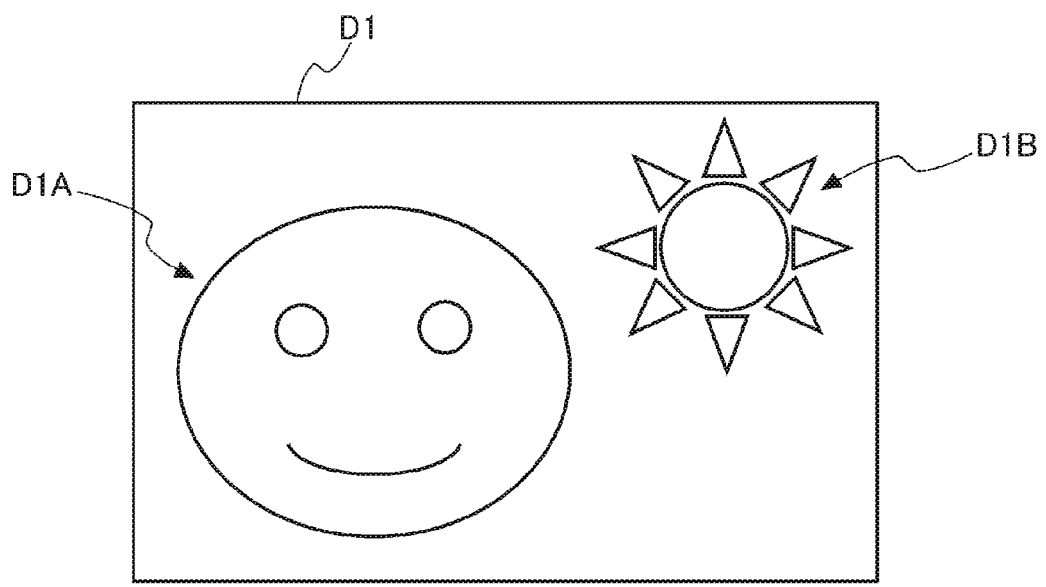
FIG. 5 shows an example of image data.

In a case where the operation of selecting a thumbnail image has not been accepted (NO in step S4), the display controller 172 waits until the operation of selecting a thumbnail image is accepted. In a case where the operation of selecting a thumbnail image has been accepted (YES in step S4), the display controller 172 stores information that identifies the image data D1 corresponding to the selected thumbnail image in a memory (step S5). FIG. 5 shows an example of the selected image data D1. The image data D1 contains two display images, a display image D1A and a display image D1B.

The display controller 172 then causes the operation/display panel 131 to display a display image list that lists thumbnail images of the mask image data D2 stored in the storage 160 (step S6). The user operates the operation keys on the operation/display panel 131 to select one of thumbnail images in the display image list displayed on the operation/display panel 131.

In a case where the operation of selecting a thumbnail image has not been accepted (NO in step S7), the display controller 172 waits until the operation of selecting a thumbnail image is accepted. In a case where the operation of selecting a thumbnail image has been accepted (YES in step S7), the display controller 172 stores information that identifies the mask image data D2 corresponding to the selected thumbnail image in the memory (step S8).

The display controller 172 then combines the image data D1 selected in step S4 with the mask image data D2 selected in step S7 to produce combined image data D3 (step S9).

The process in step S9 will be described below in detail. The display controller 172 first instructs the image processor 153 to develop in the frame memory 157 the image data D1 corresponding to the information that identifies the image data D1 and has been stored in the memory. The image processor 153 reads the specified image data D1 from the storage 160 and develops the read image data D1 in the frame memory 157.

The display controller 172 then, assuming that the image data D1 is developed in a memory, such as a RAM, determines, based on information on the size of the image data D1 (vertical and horizontal sizes), the on-memory coordinates where the vertices at the four corners of the image data D1 are located. The process described above is a process carried out to allow the display controller 172 to manage the positions and ranges of the image data D1 and the mask image data D2 developed in the frame memory 157 in a case where the image data D1 and the combined image data D3 are scrolled in accordance with scroll operation that will be described later. For example, the display controller 172 manages the coordinates of the four vertices of the image data D1 by setting in the memory a coordinate system having an origin that coincides with the upper left vertex of the image data D1, an axis X that extends in the vertical direction, and an axis Y that extends in the horizontal direction.

The display controller 172 then instructs the image combiner 155 to develop in the frame memory 157 the mask image data D2 corresponding to the identification information stored in the memory. The image combiner 155 reads the mask image data D2 specified by the display controller 172 from the storage 160 and develops the read mask image data D2 in the frame memory 157. The combined image data D3 that is the image data D1 combined with the mask image data D2 is thus produced in the frame memory 157 (step S9).

The display controller 172 then, assuming that the mask image data D2 is developed in a memory, such as a RAM, determines, based on information on the size of the mask image data D2 (vertical and horizontal sizes), the on-memory coordinates where the vertices at the four corners of the mask image data D2 are located. The display controller 172 further determines the coordinates of the vertices at the four corners of an evaluation range 23. The evaluation range 23 will be described with reference to FIG. 7.

Having produced the combined image data D3 in the frame memory 157, the image combiner 155 reads the combined image data D3 from the frame memory 157 and outputs the read combined image data D3 to the light modulator driver 122 in the display section 110.

Figure 6:
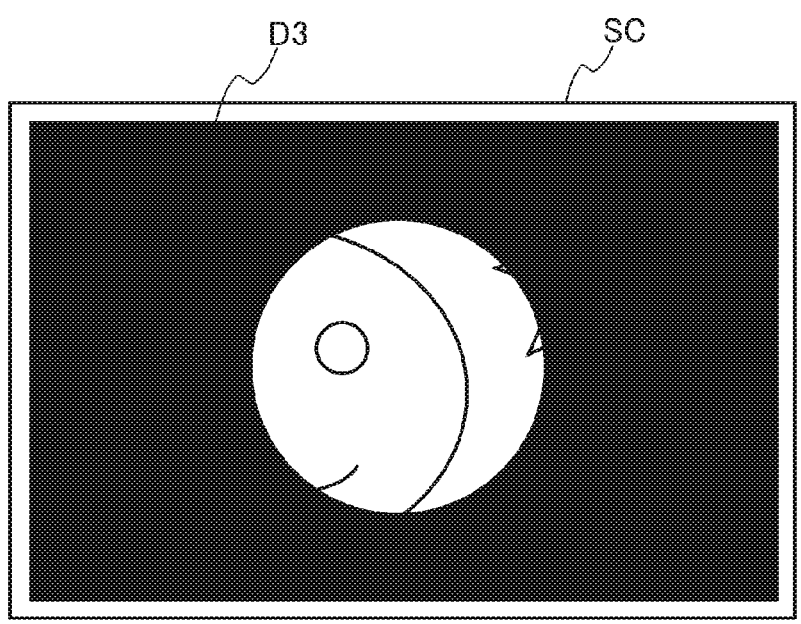
FIG. 6 shows a combined image displayed on a screen.

The display section 110 causes the light modulator driver 122 to produce R, G, and B drive signals based on the combined image data D3. The display section 110 uses the produced drive signals to drive the corresponding liquid crystal panels 115 of the light modulator 112 to draw images in the liquid crystal panels 115. An image based on the combined image data D3 (hereinafter referred to as combined image) is thus displayed on the screen SC (step S10). FIG. 6 shows the combined image displayed on the screen SC.

When the combined image is displayed on the screen SC, the user operates the remote control 105 to change the range of a display image displayed as part of the combined image. In the combined image, the range of the image data D1 on which the non-mask area 22 of the mask image data D2 is superimposed is displayed as the display image. The user operates, for example, a cross key on the remote control 105 to move the display image upward, downward, rightward, and leftward in such a way that the display image range that the user desires to display falls within the non-mask area 22. The range of the image data D1 on which the non-mask area 22 is superimposed is not masked with the mask image data D2 but is displayed on the screen SC.

The display controller 172 then evaluates whether or not scroll operation of scrolling the display image, that is, the image data D1 has been accepted from the remote control 105 (step S11). The display controller 172 determines that the scroll operation has been accepted when an operation signal corresponding to the scroll operation is inputted via the input/output I/F section 133 (step S11). In a case where no scroll operation has been accepted (NO in step S11), the display controller 172 moves to the evaluation in step S16. In a case where the scroll operation has been accepted (YES in step S11), the display controller 172 determines, based on the operation signal inputted via the input/output I/F section 133, the direction in which and the distance by which the image data D1 is scrolled (moved) (step S12). After the image data D1 is moved based on the determined scroll direction and distance, the display controller 172 evaluates whether or not the area outside the image data D1 is contained in the range where the non-mask area 22 of the mask image data D2 is superimposed.

Figure 7:
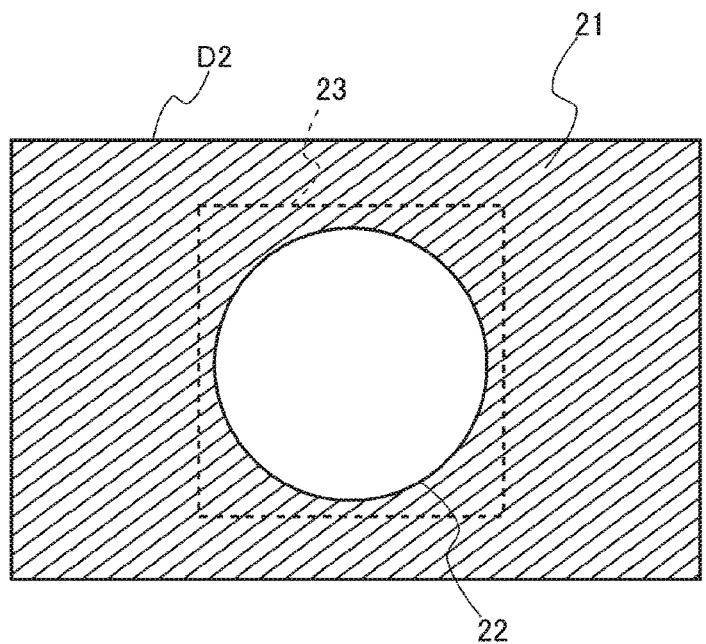
FIG. 7 shows an evaluation range.

FIG. 7 shows the evaluation range 23 corresponding to the mask image data D2.

The evaluation range 23 is set in the mask image data D2. The evaluation range 23 is a range for evaluating whether or not the image data D1 is scrollable in the case where the mask image data D2 is superimposed on the image data D1. The display controller 172 evaluates whether not a blank area that is the area outside the image data D1 is contained in the evaluation range 23 when the image data D1 is scrolled based on the scroll operation to evaluate whether or not the image data D1 is scrollable.

The evaluation range 23 is set in correspondence with the shape and size of the mask area 21 of the mask image data D2. That is, in a case where the shape and size of the mask area 21 vary, the shape and range of the evaluation range 23 are also set differently. The evaluation range 23 shown in FIG. 7 is a rectangular area that surrounds the circumference (upper, lower, right and, left sides) of the non-mask area 22 and is so set that the distances from the center of the non-mask area 22, which has a circular shape, to the four sides of the evaluation range 23 are equal to one another. The shape and size of the evaluation range 23 are not limited to those shown in FIG. 7. For example, the evaluation range 23 does not necessarily have a rectangular shape and may have a circular or polygonal shape. The evaluation range 23 may instead be so set as to have the same size and shape as those of the boundary line between the mask area 21 and the non-mask area 22.

The display controller 172 performs computation based on the on-memory coordinates representing the positions of the four vertices of the image data D1, the on-memory coordinates representing the positions of the four vertices of the mask image data D2, and the on-memory coordinates representing the evaluation range 23. The display controller 172 evaluates whether or not after the coordinates of the four vertices of the image data D1 are moved based on the determined scroll direction and distance, the blank area outside the image data D1 falls within the area defined by the coordinates representing the evaluation range 23. In a case where the display controller 172 determines that the blank area falls within the area defined by the coordinates representing the evaluation range 23 (YES in step S13), the display controller 172 determines that the operation accepted in step S11 is invalid operation (step S14) and returns to the evaluation in step S11.

Figure 8:
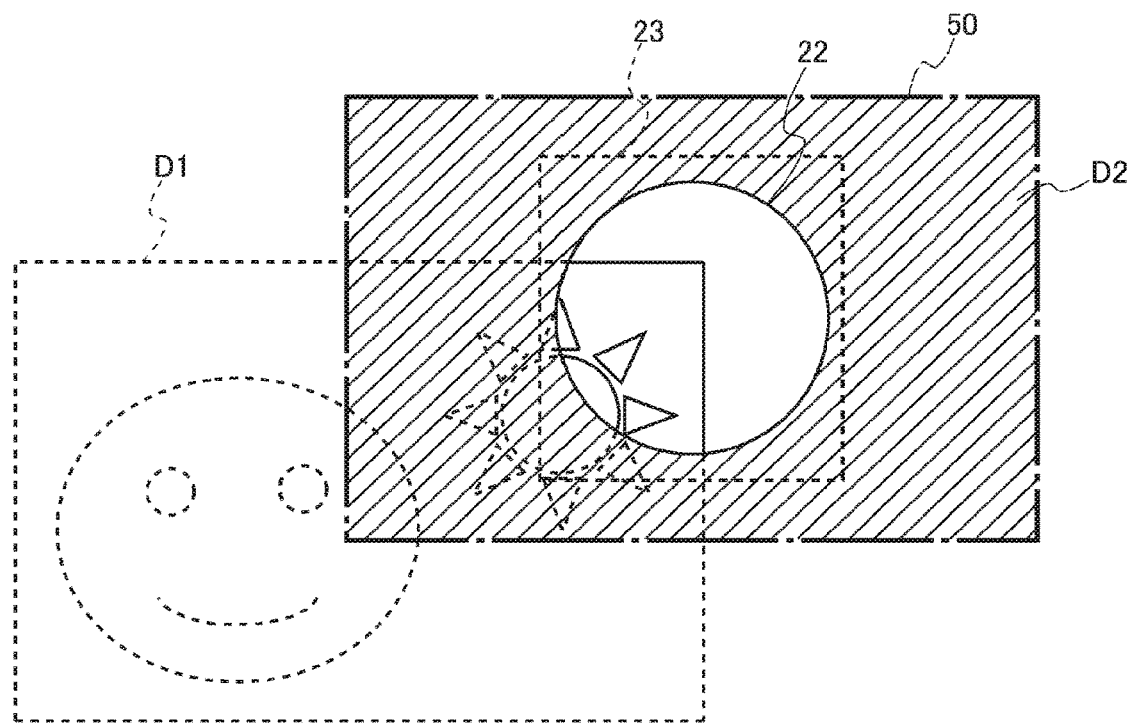
FIG. 8 shows a case where a blank area of image data falls within the evaluation range.

FIG. 8 shows a case where the image data D1 is so scrolled that the blank area of the image data D1 falls within the evaluation range 23.

In the case where the blank area falls within the evaluation range 23, the blank area is not masked by the mask image data D2 but is displayed in some cases. The display controller 172 therefore determines the operation accepted in step S11 is invalid operation in the case where the blank area falls within the area defined by the coordinates representing the evaluation range 23.

In FIG. 8, a range 50 drawn with the dashed line is a display range 50, which is the range of the image data D1 or the mask image data D2 developed in the frame memory 157. The display controller 172 moves the coordinates of the four vertices representing the range of the image data D1 or the coordinates of the four vertices representing the range of the mask image data D2 and then determines the range of the image data D1 or the mask image data D2 contained in the display range 50. The range of the image data D1 or the mask image data D2 contained in the display range 50 forms data to be developed in the frame memory 157. The coordinates representing the display range 50 coincide with the on-memory coordinates where the four vertices of the image data D1 before the scroll are located.

In the case where accepted operation is invalid, the display controller 172 notifies the user that the operation is invalid. For example, the display controller 172 may display on the screen SC a message that notifies that the operation is invalid. In a case where the projector 100 includes a loudspeaker, the display controller 172 may cause the loud speaker to radiate preset sound. Having notified that the operation accepted in step S11 is invalid operation, the display controller 172 returns to the evaluation in step S11.

In a case where the display controller 172 determines that the blank area, which is the range outside the image data D1, does not fall within the evaluation range 23 (NO in step S13), the display controller 172 determines that the operation accepted in step S11 is valid operation. Having determines that the scroll operation is valid operation, the display controller 172 determines the range of the image data D1 developed in the frame memory 157 when the image data D1 is scrolled based on the scroll operation. The display controller 172 further determines the range of the frame memory 157 where the image data D1 is developed.

Specifically, the display controller 172 moves the coordinates of the four vertices of the image data D1 based on the direction and distance determined in step S12 and identifies the coordinates of the pixels of the image data D1 contained in the display range 50. The display controller 172 determines the identified coordinates of the pixels of the image data D1 as the range of the image data D1 to be developed in the frame memory 157. The display controller 172 further determines the coordinates of the display range 50 where the identified pixels of the image data D1 are developed and determines, based on the determined coordinates, the coordinates in the frame memory 157 where the image data D1 is developed. The coordinates in the frame memory 157 where the pixels of the image data D1 are developed form information representing the range of the frame memory 157. In a case where the coordinates of the display range 50 directly correspond to the coordinates of the frame memory 157, no process of converting the coordinates of the display range 50 into the coordinates of the frame memory 157 is required.

The display controller 172 outputs a scroll instruction containing information representing the determined range of the image data D1 and the determined range of the frame memory 157 where the image data D1 is developed to the image processor 153.

The image processor 153 develops the image data D1 in the specified range in the specified range of the frame memory 157 in accordance with the scroll instruction inputted from the display controller 172 to move the image data D1 in the frame memory 157 (step S15).

The display controller 172 then instructs the image combiner 155 to develop the mask image data D2, and the image combiner 155 develops the mask image data D2 in the frame memory 157 in accordance with the instruction from the display controller 172. The image combiner 155 then reads the combined image data D3 from the frame memory 157 and outputs the combined image data D3 to the display section 110, whereby the range of the display image displayed as part of the combined image is changed.

Figure 9:
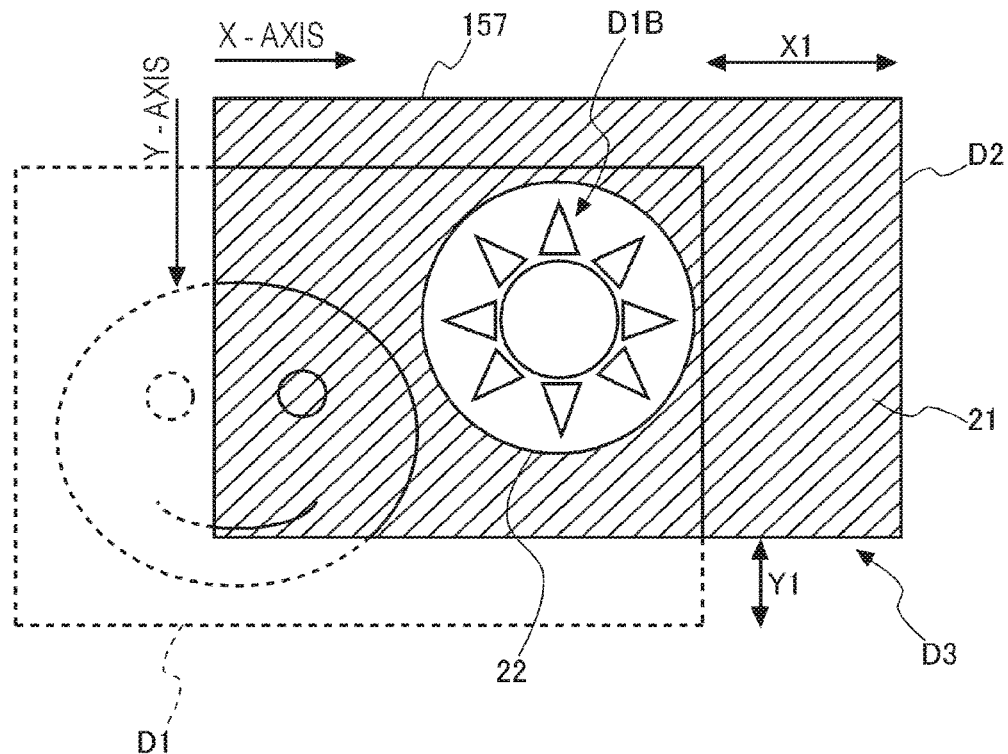
FIG. 9 shows a frame memory in which the image data and the mask image data are developed.
Figure 10:
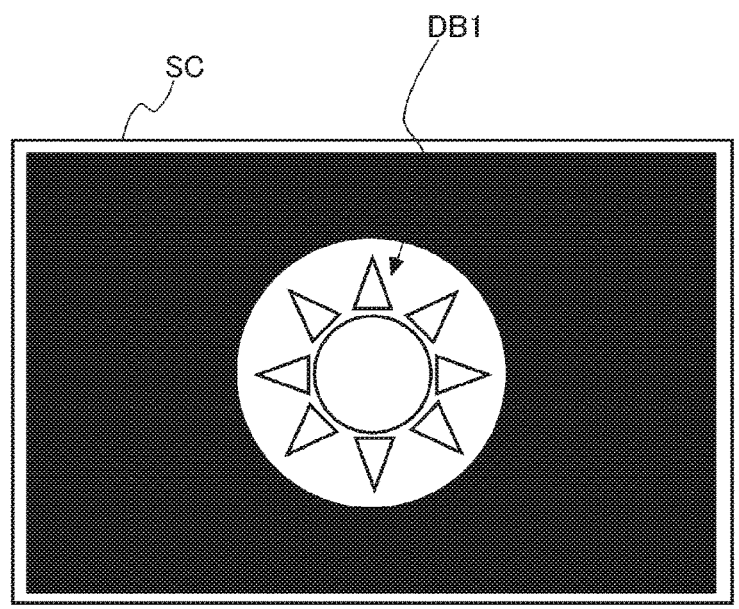
FIG. 10 shows the combined image displayed on the screen.

FIG. 9 shows the frame memory 157 in which the image data D1 and the mask image data D2 are developed. FIG. 10 shows the combined image displayed on the screen SC based on the combined image data D3 developed in the frame memory 157 shown in FIG. 9.

FIG. 9 shows that the image data D1 has been moved by X1 in the X-axis direction, which is the horizontal direction of the frame memory 157, and by Y1 in the Y-axis direction, which is the vertical direction of the frame memory 157. The range of the image data D1 drawn with the broken line in FIG. 9 is the range of the data that does not fall within the range of the frame memory 157 due to the movement by (X1, Y1) and is therefore not developed in the frame memory 157. The hatched range of the mask image data D2 in FIG. 9 represents the mask area 21. Further, FIG. 9 shows a state in which the display image D1B is developed in the non-mask area 22 of the mask image data D2 after the movement of the image data D1 by (X1, Y1). The display image D1B developed in the non-mask area 22 is not masked by the mask image data D2 but is displayed.

The display controller 172 then evaluates whether or not zoom (digital zoom) operation that enlarges the display image has been accepted (step S16). In a case where no zoom operation has been accepted (NO in step S16), the display controller 172 moves to the evaluation in step S18 shown in FIG. 4.

In a case where the zoom operation has been accepted (YES in step S16), the display controller 172 changes the on-memory coordinates representing the positions of the four vertices of the image data D1 in accordance with a set zoom magnification. That is, the display controller 172 determines the coordinates of the four vertices of the image data D1 enlarged in accordance with the zoom magnification. Out of the pixels of the enlarged image data D1, the display controller 172 identifies the coordinates of the pixels of the image data D1 that are contained in the display range 50. The display controller 172 determines the identified coordinates of the pixels of the image data D1 as the range of the image data D1 to be developed in the frame memory 157. The display controller 172 further determines the coordinates of the display range 50 where the identified pixels of the image data D1 are developed and determines, based on the determined coordinates, the coordinates in the frame memory 157 where the image data D1 is developed. The coordinates in the frame memory 157 where the pixels of the image data D1 are developed form information representing the range of the frame memory 157. The display controller 172 outputs a zoom instruction containing information representing the determined range of the image data D1 and the determined range of the frame memory 157 where the image data D1 is developed to the image processor 153.

The image processor 153 develops the image data D1 in the specified range in the specified range of the frame memory 157 in accordance with the zoom instruction inputted from the display controller 172. The display controller 172 further instructs the image combiner 155 to develop the mask image data D2, and the image combiner 155 develops the mask image data D2 in the frame memory 157 in accordance with the instruction from the display controller 172. The image combiner 155 then reads the combined image data D3 from the frame memory 157 and outputs the read combined image data D3 to the display section 110, whereby the display image displayed as part of the combined image is zoomed (enlarged) (step S17).

The display controller 172 then evaluates whether or not operation of scrolling the combined image has been accepted (step S18). The user operates, for example, the cross key on the remote control 105 to move the combined image upward, downward, rightward, and leftward. In a case where no operation of scrolling the combined image has been accepted (NO in step S18), the display controller 172 moves to the process in step S22.

In a case where an operation signal corresponding to the scroll operation has been inputted via the input/output I/F section 133, the display controller 172 determines that the operation of scrolling the combined image has been accepted (YES in step S18). Having accepted the operation of scrolling the combined image (YES in step S18), the display controller 172 determines, based on the operation signal inputted via the input/output I/F section 133, the direction in which and the distance by which the combined image data D3 is scrolled (moved).

The display controller 172 then evaluates whether or not an area where the combined image data D3 is not developed is created in the frame memory 157 after the combined image data D3 is moved based on the determined direction and distance. That is, the display controller 172 evaluates whether or not a blank area where the combined image data D3 is not developed is created in the display range 50 after the combined image data D3 is moved based on the determined direction and distance. In a case where the area where the combined image data D3 is not developed is created in the display range 50, the blank area where the combined image data D3 is not developed is created also in the frame memory 157 (step S19).

In a case where no blank area is created (NO in step S19), the display controller 172 determines the range of each of the image data D1 and the mask image data D2 to be developed in the frame memory 157 based on the scroll direction and distance. The display controller 172 further determines, based on the scroll direction and distance, the coordinates in the frame memory 157 where the pixels that form each of the image data D1 and the mask image data D2 are developed.

In a case where the blank area is created (YES in step S19), the display controller 172 identifies the range of the blank area created in the frame memory 157. The display controller 172 produces information representing the identified range of the blank area (coordinate information) and information that instructs development of the mask image data D2 in the blank area.

The display controller 172 outputs a scroll instruction containing the determined range of the image data D1 and the determined range in the frame memory 157 where the image data D1 is developed to the image processor 153. The same scroll instruction is used both in the case where the blank area is created in the frame memory 157 and in the case where no blank area is created in the frame memory 157.

In the case where no blank area is created in the frame memory 157, the display controller 172 then outputs a scroll instruction containing the range of the mask image data D2 and the range in the frame memory 157 where the mask image data D2 is developed to the image combiner 155. In the case where the blank area is created in the frame memory 157, the display controller 172 outputs a scroll instruction containing the produced information representing the range of the blank area (coordinate information) and information that instructs development of the mask image data D2 in the blank area to the image combiner 155.

The image processor 153 then develops the image data D1 in the frame memory 157 in accordance with the scroll instruction inputted from the display controller 172. The image combiner 155 develops the mask image data D2 in the frame memory 157 in accordance with the scroll instruction inputted from the display controller 172. In the case where the blank area is created in the frame memory 157, the image combiner 155 identifies the area that is part of the frame memory 157 and corresponds to the blank area based on the scroll instruction. The image combiner 155 then develops the mask image data D2 in the area that is part of the frame memory 157 and corresponds to the identified blank area (step S20). When the image combiner 155 reads the combined image data D3 from the frame memory 157 and outputs the read combined image data D3 to the display section 110, the scrolled combined image is displayed on the screen SC (step S21).

Figure 11:
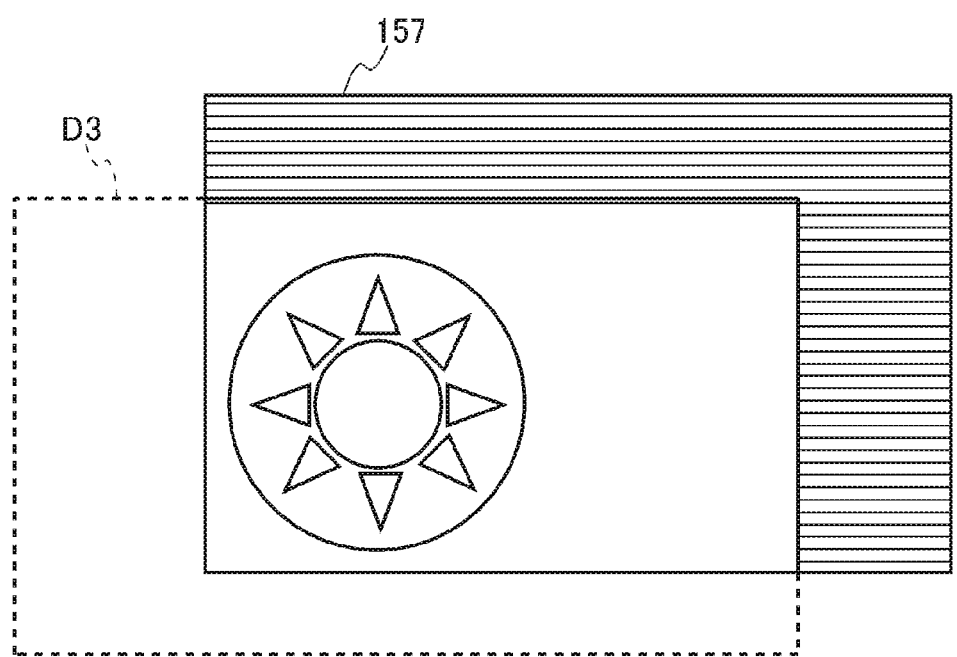
FIG. 11 shows the frame memory in which the combined image data has been developed.

FIG. 11 shows the frame memory 157 in which the combined image data D3 has been developed.

The hatched range in the frame memory 157 shown in FIG. 11 is the blank area where the combined image data D3 is not developed due to the scroll of the position where the combined image data D3 is developed. The image combiner 155 develops the mask image data D2 in the blank area of the frame memory 157 in accordance with the instruction from the display controller 172. The mask image data D2 developed in the blank area is black image data corresponding to the mask area 21. A situation in which an image having a blank is displayed on the screen SC can thus be avoided.

The display controller 172 then evaluates whether or not operation of terminating the mask processing mode has been accepted in the form of operation performed on the operation/display panel 131 or operation performed on the remote control 105 (step S22).

In a case where the operation of terminating the mask processing mode has not been accepted (NO in step S22), the display controller 172 moves to the evaluation in step S11 shown in FIG. 3. In a case where the operation of terminating the mask processing mode has been accepted (YES in step S22), the display controller 172 carries out the process of terminating the mask processing mode in the order that is the reverse of the order in which the combined image data D3 is displayed on the screen SC. This process is a process for preventing the blank area where no image data D1 or mask image data D2 is present from being displayed on the screen SC.

The display controller 172 first carries out the process of returning the combined image data D3 to the position before the scroll (step S23). The display controller 172 first causes the image processor 153 to carry out the process of returning the image data D1 having been moved in the process in step S20 to the position before the scroll. The display controller 172 further causes the image combiner 155 to carry out the process of returning the mask image data D2 having been moved in the process in step S20 to the position before the scroll.

Thereafter, in the case where the zooming or any other process has been carried out, the display controller 172 causes the image processor 153 to carry out the process of changing the size of the image data D1 back to the original size. The display controller 172 further causes the image processor 153 to carry out the process of returning the image data D1 having moved in the process in step S15 to the position before the scroll (step S24). The display controller 172 finally instructs the image combiner 155 to erase the mask image data D2 (step S25).

Figure 12:
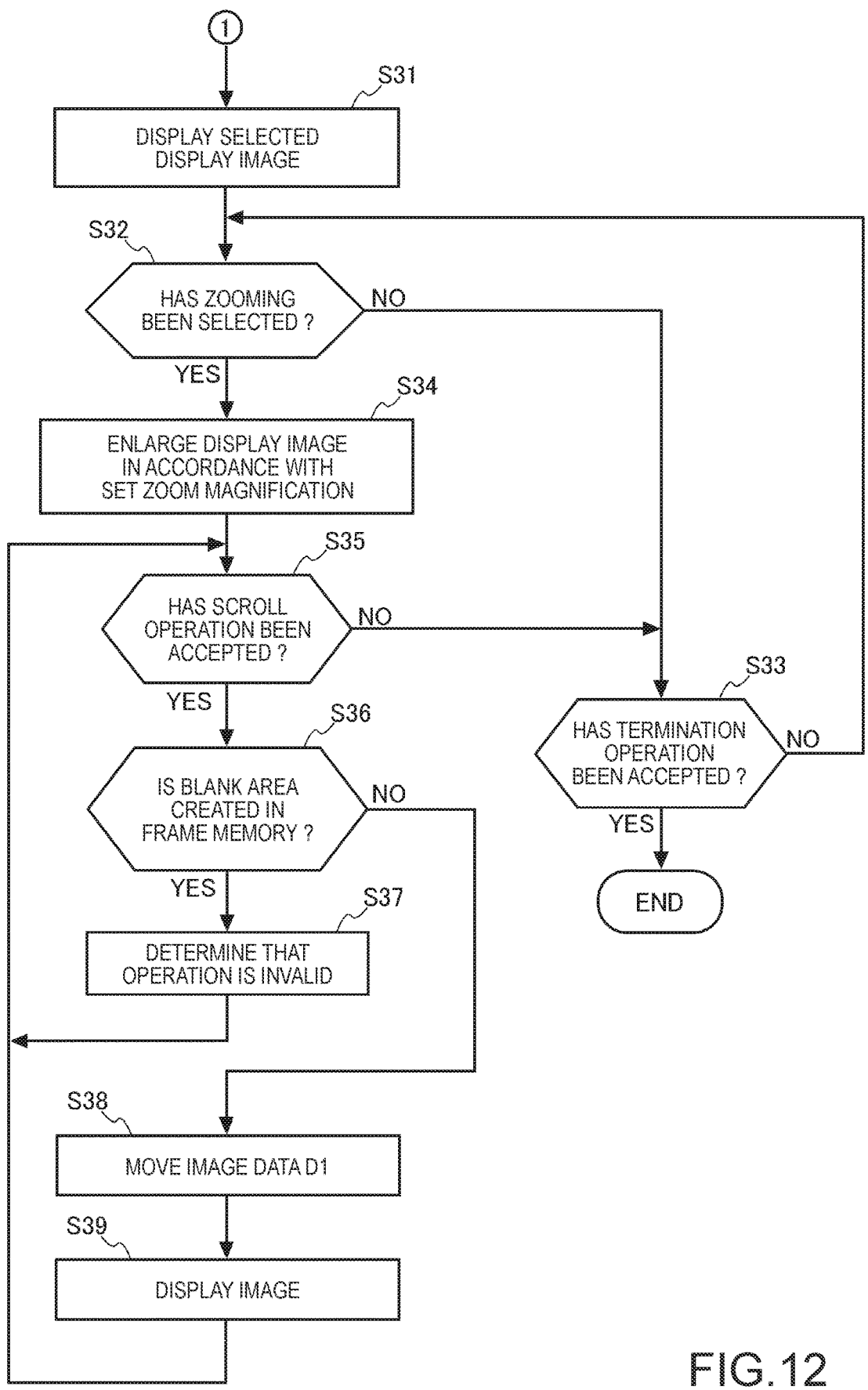
FIG. 12 is a flowchart showing actions of the display controller.

FIG. 12 is a flowchart showing actions of the display controller 172 in a case where the action mode of the projector 100 is determined to be the normal mode in the evaluation in step S2 in FIG. 3.

The display controller 172 first accepts operation of selecting image data D1 via the remote control 105 or the operation/display panel 131 through the same actions as those in steps S3 and S4 shown in FIG. 3. The display controller 172 then instructs the image processor 153 to develop the selected image data D1 in the frame memory 157. The image processor 153 reads the image data D1 from the storage 160 and develops the read image data D1 in the frame memory 157 in accordance with the instruction from the display controller 172. The image combiner 155 reads the image data D1 developed in the frame memory 157 and outputs the read image data D1 to the light modulator driver 122 in the display section 110. A display image based on the image data D1 is thus displayed on the screen SC (step S31).

The display controller 172 then evaluates whether or not the zoom (digital zoom) operation of enlarging the display image (step S32). In a case where no zoom operation has been accepted (NO in step S32), the display controller 172 moves to the evaluation in step S33. The display controller 172 evaluates whether or not operation of terminating the display of the image has been accepted (step S33). In a case where the termination operation has been accepted (YES in step S33), the display controller 172 terminates the display of the display image on the screen SC and terminates the entire processes. In a case where the termination operation has not been accepted (NO in step S33), the display controller 172 returns to the evaluation in step S32.

In a case where the evaluation in step S32 shows that the zoom operation has been accepted (YES in step S32), the display controller 172 changes the on-memory coordinates representing the positions of the four vertices of the image data D1 in accordance with a set zoom magnification. That is, the display controller 172 determines the coordinates of the four vertices of the image data D1 enlarged in accordance with the zoom magnification. The display controller 172 then determines the range of the image data D1 to be developed in the frame memory 157 and the range (coordinates) in the frame memory 157 where the image data D1 is developed and outputs a zoom instruction containing the determined information to the image processor 153.

The image processor 153 develops the image data D1 in the specified range at the specified coordinates in the frame memory 157 in accordance with the zoom instruction inputted from the display controller 172. The image combiner 155 then reads the image data D1 from the frame memory 157 and outputs the read image data D1 to the display section 110, whereby the display image displayed on the screen SC is zoomed (enlarged) in accordance with the set zoom magnification (step S34).

The display controller 172 then evaluates whether or not scroll operation has been accepted (step S35). In a case where no scroll operation has been accepted (NO in step S35), the display controller 172 moves to the evaluation in step S33.

In a case where scroll operation has been accepted, the display controller 172 determines, based on an operation signal inputted via the image input I/F section 151, the direction in which and the distance by which the image data D1 is scrolled. The display controller 172 moves the coordinates of the four vertices of the image data D1 in accordance with the determined scroll direction and distance and evaluates whether or not a blank area is created in the display range 50. In a case where a blank area is created in the display section 50, the display controller 172 determines that a blank area is created in the area of the frame memory 157 (YES in step S36) and determines that the operation accepted in step S35 is invalid operation (step S37). In this case, the display controller 172 returns to the evaluation in step S35.

In a case where no blank area is created in the display range 50, the display controller 172 determines that no blank area is created in the area of the frame memory 157 (NO in step S36). In this case, the display controller 172 determines, based on the scroll direction and distance, the range of the image data D1 to be developed in the frame memory 157 and the range (coordinates) in the frame memory 157 where the image data D1 is developed. The display controller 172 outputs scroll information representing the determined range of the image data D1 and the determined range (coordinates) in the frame memory 157 to the image processor 153.

The image processor 153 develops the image data D1 in the specified range at the specified coordinates in the frame memory 157 in accordance with the scroll instruction inputted from the display controller 172 to move the position where the image data D1 is developed (step S38). The image combiner 155 reads the image data D1 from the frame memory 157 and outputs the read image data D1 to the display section 110. The display image scrolled in correspondence with the scroll operation is thus displayed on the screen SC (step S39). When the process in step S39 is completed, the display controller 172 returns to the evaluation in step S35 and evaluates whether or not scroll operation has been accepted.

A description will now be made of a scroll range over which the image data D1 is scrolled in the case where the action mode of the projector 100 is the mask processing mode and in the case where the action mode of the projector 100 is the normal mode.

In the case where the action mode of the projector 100 is the mask processing mode, a combined image that is the image data D1 on which the mask image data D2 superimposed is displayed on the screen SC. Therefore, even in the case where the blank area outside the image data D1 is developed in the frame memory 157, the mask area 21 of the mask image data D2 is superimposed on the blank area, whereby the blank area outside the image data D1 is not displayed on the screen SC.

In contrast, in the case where the action mode of the projector 100 is the normal mode, no mask image data D2 is superimposed on an image displayed on the screen SC. Therefore, in the normal mode, the blank area outside the image data D1 is not allowed to be developed in the frame memory 157. The scroll range over which the image data D1 is scrolled in the mask processing mode is therefore wider than the scroll range over which the image data D1 is scrolled in the normal mode.

As described above, the projector 100 according to the present embodiment includes the display section 110, the remote control 105 or the operation/display panel 131 as an operation section, the image combiner 155, and the display controller 172.

The display section 110 displays images in the liquid crystal panels 115. The remote control 105 or the operation/display panel 131 accepts the user's operation. The image combiner 155 superimposes the mask image data D2 on the image data D1 to produce the combined image data D3. The display controller 172 causes the display section to display one of the image data D1 and the combined image data D3 in accordance with the operation accepted by the operation section. In the case where the display section 110 displays the image data D1, the display controller 172 scrolls the image data D1 within the liquid crystal panels 115 in accordance with operation accepted by the operation section. In the case where the display section 110 displays the combined image data D3, the display controller 172 scrolls the image data D1 that forms the combined image data D3 within the liquid crystal panels 115 in accordance with operation accepted by the operation section.

The scroll range over which the image data D1 that forms the combined image data D3 is scrolled in the case where the display section 110 displays the combined image data D3 is wider than the scroll range over which the image data D1 is scrolled in the case where the display section 110 displays the image data D1.

The scroll range over which the image data D1 is scrolled can therefore be changed in accordance with the image display state, whereby the operability of the projector 100 can be increased.

In the case where the display section 110 displays the combined image data D3, the display controller 172 scrolls the image data D1 within the liquid crystal panels 115 in such a way that the blank area outside the image data D1 falls within the liquid crystal panels 115. In the case where the display section 110 displays the image data D1, the display controller 172 scrolls the image data D1 within the liquid crystal panels 115 in such a way that the blank area outside the image data D1 does not fall within the liquid crystal panels 115.

The scroll range over which the image data D1 is scrolled can therefore be changed in accordance with the image display state, whereby the operability of the projector 100 can be increased.

The mask image data D2 has the mask area 21, which masks the image data D1 in the combined image data D3, and the non-mask area 22, which does not mask the image data D1 in the combined image data D3.

In the case where the non-mask area 22 is superimposed on a range containing the blank area outside the image data D1, the display controller 172 determines that operation accepted by the operation section is invalid.

A situation in which the blank area outside the image data D1 is not masked but is displayed can therefore be avoided.

The display controller 172 changes the position of the image data D1 on which the mask image data D2 is superimposed in accordance with operation accepted by the operation section to change the range of the image data D1 displayed as part of the combined image data D3.

The range of the image data D1 that is not masked by the mask image data D2 but is displayed can therefore be changed in the combined image data D3.

In the state in which the display section 110 displays the combined image data D3, and in the case where the display controller 172 causes the liquid crystal panels 115 to each display a range containing an area outside the combined image data D3 in accordance with operation accepted by the operation section, the display controller 172 causes the mask image data D2 to be displayed in the area of each of the liquid crystal panels 115 that corresponds to the area outside the combined image data D3.

Therefore, in the case where a range containing an area outside the combined image data D3 is displayed, the mask image data D2 can be displayed.

The mask image data D2 is an image in which a predetermined range of the mask image data D2 is the non-mask area and the range excluding the predetermined range is the mask area.

Therefore, in image data on which the mask image data D2 is superimposed, the predetermined range can be displayed, and the range excluding the predetermined range can be masked.

The display controller 172 enlarges the image data D1 that forms the combined image data D3 in accordance with operation accepted by the operation section.

The image data D1 that forms the combined image data D3 can therefore be enlarged and displayed.

The embodiment described above is a preferable form in which the invention is implemented. The invention is, however, not limited to the embodiment described above, and a variety of changes can be made thereto to the extent that the changes do not depart from the substance of the invention.

For example, in the embodiment described above, the projector 100 has been described as a liquid crystal projector using transmissive liquid crystal panels. The projector 100 may instead be a projector using reflective liquid crystal panels or digital mirror devices. Further, the display apparatus is not limited a projector that projects an image on the screen SC and may instead be a liquid crystal monitor or a liquid crystal television that displays an image on a liquid crystal panel. The display apparatus may still instead be a monitor apparatus or a television receiver that displays an image on a PDP (plasma display panel). The display apparatus may still instead be a monitor apparatus or a television receiver that displays an image on an OLED (organic light emitting diode) or an organic EL display panel called, for example, OEL (organic electro-luminescence).

The functional blocks of the projector 100 shown in the schematic view of FIG. 1 represent the functions of the projector 100 that are classified in accordance with the contents of the primary processes carried out by the projector 100. The configuration of the projector 100 can be further divided into a larger number of functional blocks in accordance with the contents of the processes. The process carried out by each of the functional blocks may be carried out by one piece of hardware or a plurality of pieces of hardware. The process carried out by each of the functional blocks may be achieved by one program or a plurality of programs.

The process units in the flowcharts shown in FIGS. 3, 4, and 12 are process units divided in accordance with the contents of the primary processes for easy understanding of the processes carried out by the controller 170 of the projector 100, and how to produce the divided process units or the names of the process units do not limit the embodiment of the invention. A process carried out by the controller 170 can be further divided into a larger number of process units in accordance with the content of the process, and each of the process units can further be divided into a large number of processes. Further, the orders in which the processes are carried out in the flowcharts described above are not limited to those shown in FIGS. 3, 4, and 12.

What is claimed is:

1. A display apparatus comprising:
a display section that displays an image in a display area;
an operation section that accepts operation;
a superimposing section that produces a superimposed image that is an input image on which a mask image is superimposed; and
a display controller that:
casues the display section to display one of the input image and the superimposed image in accordance with operation accepted by operation section;
scrolls the input image within the display area in accordance with operation accepted by the operation section in such a way that a blank area outside the input image does not fall within the display area, in a case where the display section displays the input image; and
scrolls the input image that forms the superimposed image within the display area in accordance with operation accepted by the operation section in such a way that the blank area outside the input image falls within the display area, in a case where the display section displays the superimposed image,
wherein a scroll range over which the input image is scrolled is wider when the superimposed image is displayed than when the input image is displayed.

2. The display apparatus according to claim 1,
wherein the mask image has a mask area that masks the input image in the superimposed image and a non-mask area that does not mask the input image in the superimposed image, and
in a case where the non-mask area is superimposed on a range containing the blank area outside the input image, the display controller determines that operation accepted by the operation section is invalid.

3. The display apparatus according to claim 2, wherein the display controller changes a position of the input image on which the mask image is superimposed in accordance with operation accepted by the operation section to change a range of the input image displayed as part of the superimposed image.

4. The display apparatus according to claim 1, wherein in a state in which the display section displays the superimposed image, and in a case where the display controller causes a range containing an area outside the superimposed image to be displayed in the display area in accordance with operation accepted by the operation section, the display controller causes the mask image to be displayed in an area of the display area that corresponds to the area outside the input image.

5. The display apparatus according to claim 1, wherein the mask image is an image in which a predetermined range of the mask image is the non-mask area and a range excluding the predetermined range is the mask area.

6. The display apparatus according to claim 1, wherein the display controller enlarges the input image that forms the superimposed image in accordance with operation accepted by the operation section.

7. A method for controlling a display apparatus including a display section that displays an image in a display area, an operation section that accepts operation, and a superimposing section that produces a superimposed image that is an input image on which a mask image is superimposed, the method comprising:
causing the display section to display one of the input image and the superimposed image in accordance with operation accepted by operation section;
scrolling the input image within the display area in accordance with operation accepted by the operation section such that a blank area outside the input image does not fall within the display area, in a case where the display section displays the input image; and
scrolling the input image that forms the superimposed image within the display area in accordance with operation accepted by the operation section such that the blank area outside the input image falls within the display area, in a case where the display section displays the superimposed image,
wherein a scroll range over which the input image is scrolled is wider when the superimposed image is displayed than when the input image is displayed.

8. The method for controlling a display apparatus according to claim 7,
wherein the mask image has a mask area that masks the input image in the superimposed image and a non-mask area that does not mask the input image in the superimposed image, and
in a case where the non-mask area is superimposed on a range containing the blank area outside the input image, it is determined that operation accepted by the operation section is invalid.

9. The method for controlling a display apparatus according to claim 8, wherein a position of the input image on which the mask image is superimposed is so changed in accordance with operation accepted by the operation section that a range of the input image displayed as part of the superimposed image is changed.

10. The method for controlling a display apparatus according to claim 7, wherein in a state in which the display section displays the superimposed image, and in a case where a range containing an area outside the superimposed image is displayed in the display area in accordance with operation accepted by the operation section, the mask image is displayed in an area of the display area that corresponds to the area outside the input image.

11. The method for controlling a display apparatus according to claim 7, wherein the mask image is an image in which a predetermined range of the mask image is the non-mask area and a range excluding the predetermined range is the mask area.

12. The method for controlling a display apparatus according to claim 7, wherein the input image that forms the superimposed image is enlarged in accordance with operation accepted by the operation section.

* * * * *